(12) United States Patent
Tkacik et al.

(10) Patent No.: US 11,640,360 B1
(45) Date of Patent: May 2, 2023

(54) PROCESSING PIPELINE WHERE FAST DATA PASSES SLOW DATA

(71) Applicant: NXP B.V., Eindhoven (NL)

(72) Inventors: Thomas E. Tkacik, Phoenix, AZ (US); Srdjan Coric, Winchester, MA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/584,001

(22) Filed: Jan. 25, 2022

(51) Int. Cl.
*G06F 12/00* (2006.01)
*G06F 12/14* (2006.01)
*G06F 12/0891* (2016.01)
*G06F 15/78* (2006.01)
*G06F 13/16* (2006.01)
*G06F 9/30* (2018.01)

(52) U.S. Cl.
CPC ...... *G06F 12/1408* (2013.01); *G06F 9/30079* (2013.01); *G06F 9/30189* (2013.01); *G06F 12/0891* (2013.01); *G06F 12/1425* (2013.01); *G06F 12/1466* (2013.01); *G06F 13/1626* (2013.01); *G06F 13/1673* (2013.01); *G06F 15/7807* (2013.01)

(58) Field of Classification Search
CPC ............. G06F 12/1408; G06F 9/30079; G06F 9/30189; G06F 12/0891; G06F 12/1425; G06F 12/1466; G06F 13/1626; G06F 13/1673; G06F 15/7807
See application file for complete search history.

(56) References Cited

U.S. PATENT DOCUMENTS

| 5,844,830 A | 12/1998 | Gorshtein et al. | |
|---|---|---|---|
| 8,125,489 B1 | 2/2012 | Holmqvist et al. | |
| 8,650,813 B2 | 2/2014 | Botkin et al. | |
| 10,108,397 B2 | 10/2018 | Ahmed | |
| 10,956,168 B2 | 3/2021 | Francois et al. | |
| 2011/0154061 A1* | 6/2011 | Chilukuri | H04L 9/0891 713/193 |
| 2016/0364343 A1* | 12/2016 | Case | G06F 12/145 |

OTHER PUBLICATIONS

U.S. Appl. No. 17/246,042, filed Apr. 30, 2021.

* cited by examiner

*Primary Examiner* — Arvind Talukdar (57) ABSTRACT

Various embodiments relate to an inline encryption engine in a memory controller configured to process data read from a memory, including: a first data pipeline configured to receive data that is plaintext data and a first validity flag; a second data pipeline having the same length as the first data pipeline configured to: receive data that is encrypted data and a second validity flag; decrypt the encrypted data from the memory and output decrypted plaintext data; an output multiplexer configured to select and output data from either the first pipeline or the second pipeline; and control logic configured to control the output multiplexer, wherein the control logic is configured to output valid data from the first pipeline when the second pipeline does not have valid output decrypted plaintext data available.

24 Claims, 3 Drawing Sheets

PROCESSING PIPELINE WHERE FAST DATA PASSES SLOW DATA

TECHNICAL FIELD

Various exemplary embodiments disclosed herein relate generally to a system and method for inline encryption/decryption of data including an encryption pipeline where fast data passes slow data.

Inline encryption is the method of encrypting or decrypting data while accessing external memory such as double data rate (DDR) memory. This allows for data to be securely stored in memory in order to prevent unauthorized access to the data. Such encryption and decryption may be accomplished in a manner that is transparent to the user or system accessing the memory.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to an inline encryption engine in a memory controller configured to process data read from a memory, including: a first data pipeline configured to: receive data that is encrypted data, an order tag of the encrypted data, and a first validity flag; decrypt the encrypted data from the memory; and output decrypted plaintext data; a second data pipeline configured to receive data that is plaintext data, an order tag for the data, and a second validity flag, wherein the second data pipeline includes a buffer so that the second data pipeline has the same length as the first data pipeline; an output multiplexer configured to select and output data from either the first pipeline or the second pipeline; and control logic configured to control the output multiplexer, wherein the control logic is configured to output valid data from the second pipeline when the first pipeline does not have valid output decrypted plaintext data available.

Various embodiments are described, further comprising a key store and region context logic configured to provide a cryptographic key to the first pipeline based upon a region of the memory where the encrypted data is stored.

Various embodiments are described, wherein the key store and region context logic are further configured to select whether the first pipeline or the second pipeline receives data read from the memory.

Various embodiments are described, further including a third pipeline including a buffer so that the third data pipeline has the same length as the first data pipeline and the third pipeline configured to: receive data that is encrypted data, an order tag for the data and a third validity flag; decrypt the encrypted data from the memory; and output decrypted plaintext data, wherein an output multiplexer configured to select and output data from either the first pipeline, the second pipeline, or the third pipeline.

Various embodiments are described, wherein the control logic is configured to output valid data from the third pipeline when the first pipeline does not have valid output decrypted plaintext data available.

Various embodiments are described, wherein the control logic is configured to output valid received data from the second pipeline when the first pipeline and the third pipeline do not have valid output decrypted plaintext data available.

Various embodiments are described, further including: a memory interface connected to an input of the inline encryption engine; and a re-order buffer connected to the output of the inline encryption engine wherein the order tag identifies the out of order blocks of output data.

Various embodiments are described, wherein the order tag is a memory address.

Further various embodiments relate to a n inline encryption engine in a memory controller configured to process data read from a memory, including: a first-in-first-out buffer (FIFO) configured to receive the data read from the memory, a validity flag associated with the data, an address of the data, and a bypass flag associated with the data, wherein the bypass flag indicates whether the data is plaintext data or encrypted data; a cryptographic pipeline configured to: receive the data read from the memory; and perform a cryptographic function on data from the memory; a bypass multiplexer connected to each stage of the FIFO configured to output the data and the validity flag, bypass flag, and address associated with the data from a selected stage of the FIFO based upon a stage pointer; an output multiplexer configured to select and output data from either the bypass multiplexor or the cryptographic pipeline based upon a first control signal; and control logic configured to control the output multiplexer and the bypass multiplexer and to produce the stage pointer and the first control signal.

Various embodiments are described, further comprising a key store and region context logic configured to produce the bypass signal associated with the data based upon the region of the memory where the data is stored.

Various embodiments are described, wherein the key store and region context logic are further configured to provide a cryptographic key to the cryptographic pipeline based upon a region of the memory where the data is stored.

Various embodiments are described, wherein control logic produces the first control signal that indicates whether the output of the output multiplexer is from the cryptographic pipeline or the bypass multiplexor connected to the FIFO.

Various embodiments are described, wherein control logic includes a priority encoder configured to: receive inputs based upon the bypass flag and validity flag from each stage of the FIFO; and produce the stage pointer, wherein the stage pointer indicates the stage of the FIFO with received valid input data available to be output.

Various embodiments are described, wherein the control logic is configured to produce a clear enable signal, and the FIFO is configured to clear the validity flag of a stage indicated by the stage pointer based upon the clear enable signal.

Various embodiments are described, wherein the first control signal is based upon a bypass flag and a validity flag from the last stage of the FIFO and a stage pointer validity flag.

Various embodiments are described, further including: a memory interface connected to an input of the inline encryption engine; and a re-order buffer connected to the output of the inline encryption engine, wherein the address of the data is used as a tag to identify the out of order blocks of output data.

Various embodiments are described, further comprising a system on chip interface connected to the re-order buffer.

Further various embodiments relate to an inline encryption engine in a memory controller configured to process data read from a memory, including: a first-in-first-out buffer (FIFO) with an output register configured to receive the data read from the memory, a validity flag associated with the data, an address of the data, and a bypass flag associated with the data, wherein the bypass flag indicates whether the data is plaintext data or encrypted data, each stage of the FIFO includes: a register; a cryptographic logic connected to the register; and a multiplexer that produces the output of the stage and receives inputs from the register and the cryptographic logic, wherein the output is selected based upon the bypass flag; a bypass multiplexer connected to each stage of the FIFO configured to output the data and the validity flag, bypass flag, and address associated with the data from a selected stage of the FIFO based upon a stage pointer; an output multiplexer configured to select and output data from either the bypass multiplexer or the FIFO based upon a first control signal; and control logic configured to control the output multiplexer and the bypass multiplexer and to produce the stage pointer and the first control signal.

Various embodiments are described, further comprising a key store and region context logic configured to produce the bypass signal associated with the data based upon the region of the memory where the data is stored.

Various embodiments are described, wherein the key store and region context logic are further configured to provide a cryptographic key to the cryptographic logic based upon a region of the memory where the data is stored.

Various embodiments are described, wherein the first control signal that indicates whether the output of the output multiplexer is from the bypass multiplexor or the FIFO.

Various embodiments are described, wherein the stage pointer indicates the stage of the FIFO an earliest received valid input data is available to be output.

Various embodiments are described, further including: a memory interface connected to an input of the inline encryption engine; and a re-order buffer connected to the output of the inline encryption engine, wherein the address of the data is used as a tag to identify the out of order blocks of output data.

Various embodiments are described, further including a system on chip interface connected to the re-order buffer.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In a computing system with external memory, the path between processor and memory may be snooped by an attacker. It is desirable to encrypt the data stored in the external memory. Encrypting data can be a time-consuming process. Embodiments of an inline encryption engine (IEE) and methods are disclosed that allow for fast inline encryption and decryption of data stored in memory. The term IEE is intended to cover inline decryption as well as encryption. A DDR controller is the memory interface logic inside a computing system between the processor and the external memory. With the IEE implemented in the DDR controller, data may be stored in memory encrypted and transparently. The IEE is fully pipelined and runs at the speed of the memory but will add a latency to memory accesses when performing encryption.

Any given memory may store both encrypted and unencrypted data. Further, the encrypted data may be encrypted using different encryption schemes. As a result the IEE will have different pipelines for reading these different types of data, and if need be decrypting/encrypting the data as needed. Each different encryption scheme might take a different number of clock cycles, thus incurring a different latency.

If data is stored unencrypted, the unencrypted data passes through the same pipeline. Data may come out of the IEE in the same order as it went in. However, unencrypted data would then have the same latency penalty as encrypted data. In some cases, this latency may be, for example, 10 to 15 clock cycles depending on the specific encryption scheme used. Embodiments described herein will allow the unencrypted data to pass the encrypted data through the pipeline. The result is that unencrypted data would have lower latency. Data coming out of the pipeline may be out of order from data that went in. The memory address of each block of data may be used as an order tag to keep track of the order of the data coming out of the pipeline. The same may apply when data is encrypted and written to the memory. The same may also apply to data being encrypted/decrypted using different encryption schemes with different latencies.

The embodiments described herein may be used in any application where data may go through multiple pipelines of different lengths, allowing the short pipeline data to pass the long pipeline data. It will also work with more than two pipelines. Further, in the described embodiments none of the pipelines will ever stall.

In the IEE described herein, the shorter pipelines are buffered to the same length as the longest pipeline. The output data of the shorter pipeline can be output from the IEE or it can enter the buffer. This is to account for the situation where two (or more) pipelines have data processing completed during the same clock cycle. The longest pipeline data has priority and is output, while the shorter pipeline data is buffered. A valid signal specifies that data is entering one of the pipelines, and an indicator signal (e.g., a bypass flag) specifies which pipeline the data entered. The valid signal and indicator signals pass through the pipeline along with the data and memory address. A priority encoder determines which short pipeline stage (or buffer) has valid data, if any. When the short pipeline has valid data and the long pipeline does not, the buffered valid data furthest along in the short pipeline data is output, and its valid signal is then negated.

Data may enter one of the pipelines every clock cycle, and data may exit the IEE any time data is available from any pipeline or buffers. The valid signal exits the pipeline along with data and memory address to indicate that data is ready during that clock cycle. If more than one pipeline has data available, the data from the longer pipeline takes priority and the shorter pipeline data gets buffered for another clock. The shorter pipelines require buffering to be exactly the same length as the longest pipeline. In one embodiment of the IEE, an optimization allows all of the pipelines to share the one set of pipeline registers to reduce area.

In the examples below, reading of data from memory will be described where the data may be unencrypted data or encrypted data that needs to be decrypted for use by the requesting processor. This may apply, for example, to a flash memory that has encrypted and clear data stored therein. Alternatively, this could apply to a memory that has had encrypted and unencrypted data written therein during operation. The embodiments described herein may apply equally to writing data to the memory where the data may be stored as clear data or where the IEE encrypts the data prior to storage in the memory.

It is noted that the encryption pipelines may use different encryption schemes and modes of operation. In the examples given below both the Advanced Encryption Standard (AES) and PRINCE encryption/decryption schemes are used. Other encryption standards/schemes may be used as well. Further, AES and PRINCE may be used using the electronic codebook (ECB), counter mode (CTR), or any other mode that does not use chaining such that the result of one operation is required for processing the next operation. In the ECB mode the input data is decrypted/encrypted using a key. In the counter mode a counter is decrypted/encrypted and then XORed with the input data.

Figure 1:
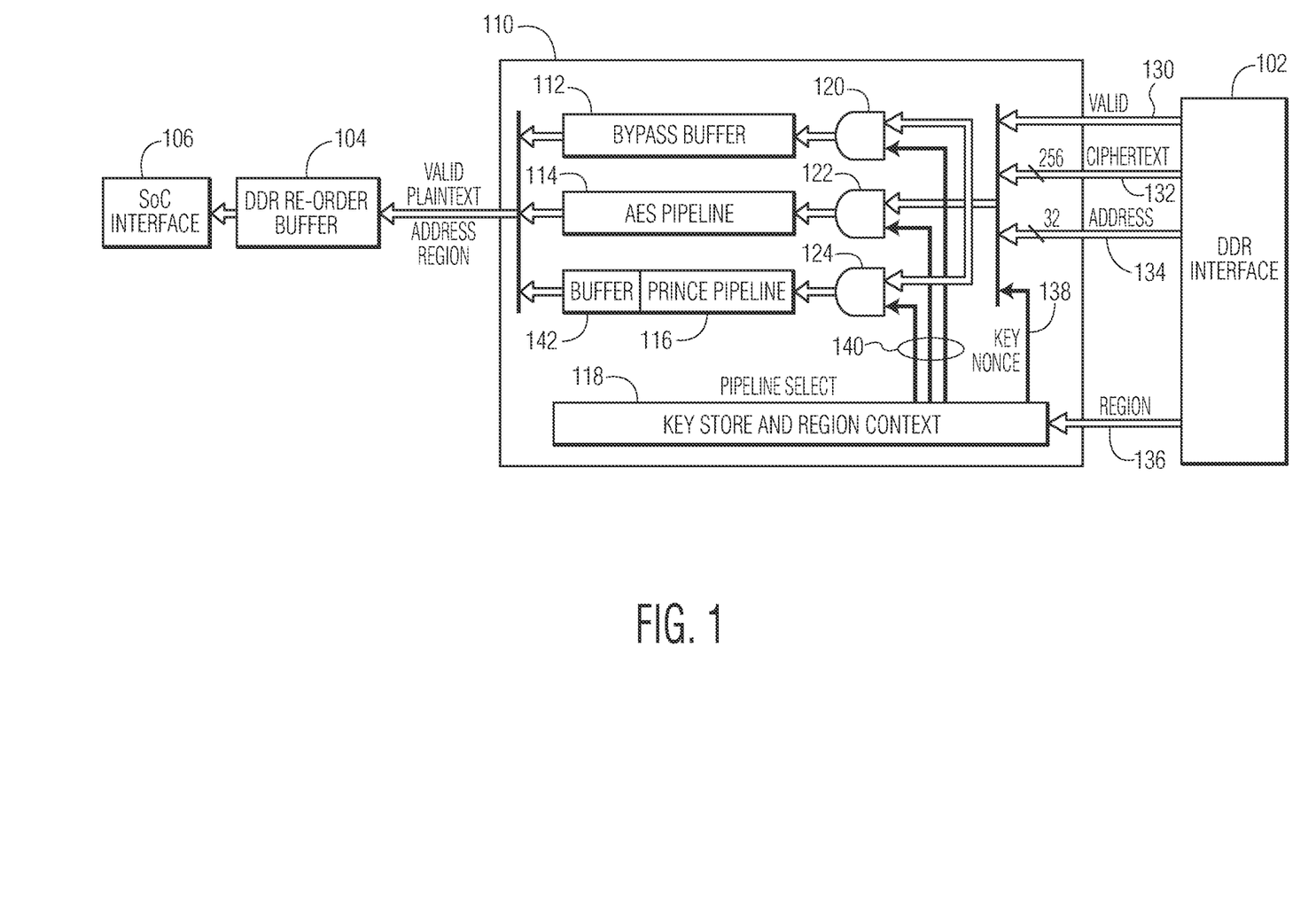
FIG. 1 illustrates an embodiment of an IEE with different encryption pipelines and a bypass buffer.

FIG. 1 illustrates an embodiment of an IEE with different encryption pipelines and a bypass buffer. FIG. 1 illustrates reading data from memory, but the same basic IEE structure may be used to write data to the memory as well, but the data flow would be in the opposite direction and encryption would occur instead of decryption. Data is read from the memory using a DDR interface 102, and an IEE 110 decrypts the read data as needed. A DDR re-order buffer 104 receives blocks of data from the IEE 110 and re-orders the data as needed and provides the data to the system-on-chip (SoC) interface 106. The memory address 134 of the ciphertext 132 is used as an order tag for the re-order buffer to identify blocks of data. In other embodiments a different order tag may be used instead of or along with the address.

The IEE 110 includes a bypass buffer 112, AES pipeline 114, PRINCE pipeline 116, a key store and region context logic 118, and AND gates 120, 122, 124. When data is read from the DDR memory the DDR interface 102 provides the IEE 110 with that data and a valid data flag 130, ciphertext 132, address 134, and region 136. The valid data flag 130 indicates that the data received on the ciphertext line 132 and address line 134 is valid, and the IEE will only read data from the ciphertext line 132 and the address line 134 when the valid data flag indicates that this data is valid. The ciphertext line 132 provides the data that has been read from the DDR memory. This data may be ciphertext or plaintext data, as either type of data may be stored in the DDR memory and read from the memory. The address line provides the address 134 associated with the data being read from the memory.

The region indicator 136 provides a region number. The DDR memory may be divided into multiple regions, each protected with its own key, or in the case of plaintext storage no key. This allows for different processes to be in different regions using their own keys. Hence, the region indicator 136 is used by the IEE 110 to determine the proper decryption key to use to decrypt encrypted data or to determine that the data is plain text and does not need to be decrypted.

The key store and region context logic 118 receives the region indicator 136. The key store and region context logic 118 outputs a key and nonce (if used) 138 to be used by the decryption pipelines. In the case of plaintext, the key store and region context logic 118 may output a predetermined key value indicating that the data read from the DDR memory is plaintext or may be some indeterminant value. The key store and region context logic 118 also produces pipeline select signals 140 that indicate which processing pipeline that IEE will use on the data read from the DDR memory. Each of the pipelines may have an associated AND gate 120, 122, 124 that receives pipeline select signals and the valid data signal 130 and that then enables the selected pipeline to receive the ciphertext 132 and the address 132 to be processed by the pipeline.

In this example, three pipelines, bypass 112, AES 114, and PRINCE 116 are illustrated. Also, only two pipelines may be present that includes a bypass buffer and a decryption pipeline. Alternatively, more than three pipelines may be present including one bypass buffer and a plurality of decryption pipelines. In this example, the decryption pipelines include the AES pipeline 114 and the PRINCE pipeline 116. For example, the AES pipeline may include 20 stages that take 20 clock cycles for input data to progress through the pipeline, and the PRINCE pipeline may include 15 stages that take 15 clock cycles for the input data to progress through the pipeline.

As mentioned above, because the decryption pipeline and the bypass buffer may have different lengths, collisions may occur at the output of the IEE 110, where two of the pipelines, e.g., the AES pipeline 114 and PRINCE pipeline 116 produce an output at the same time. To prevent such collisions, the bypass buffer 112 is given a length that is equal to the length of the longest encryption pipeline, i.e., the AES pipeline 114 in this case. Further, any other encryption pipelines add a buffer at the end of the encryption pipeline to result in a combined pipeline that has the same length as the longest encryption pipeline. In this case, the PRINCE pipeline 116 has an added buffer 142 so that its combined pipeline is the same length as the AES pipeline 114 that is the longest decryption pipeline.

The bypass buffer 112 may be implemented as a first-in-first-out buffer (FIFO). This FIFO receives the valid indicator 130, ciphertext 132 (in this case it is actually plaintext data), and address 134 and shifts the data through the FIFO. Each register of the FIFO is readable, so that data in the bypass buffer 112 may be read out early.

The AES pipeline 114 may be implemented using various known implementations of the AES decryption process. It may include a FIFO that moves data through the pipeline, and the cryptographic processing needed at each stage is performed on the data as is moves through the FIFO.

Likewise, the PRINCE pipeline may be implemented using various known implementations of the PRINCE decryption algorithm. It may include a FIFO that moves data through the pipeline, and the cryptographic processing needed at each stage is performed on the data as is moves through the FIFO. Further, the PRINCE pipeline buffer 142 may be a FIFO with early read just like that in the bypass buffer 112, just shorter.

Having buffers that result in each of the pipelines having the same length will prevent output collisions among the various pipelines when the pipelines are heavily loaded. For example, when data is continuously read out from the memory, data will be moving through only one of the pipelines at each stage. The data is ready to be output from the different pipelines at different stages. In the bypass buffer 112 any data that enters this pipeline is immediately ready to be output from the IEE 110. In the PRINCE pipeline 116, the data is only ready to be output after stage 15 where the decrypted data has been fully decrypted. Where in the AES pipeline 114 the output is only available after stage 20 where the decrypted data has been fully decrypted.

As described above, if plaintext is forced to progress through its complete bypass buffer 112 before being output from the IEE 110, this adds an unnecessary delay to outputting this data in certain situations. There are a few situations where plaintext data may bypass previously read encrypted data that is being processed in its associated decryption pipeline. For example, when there is no data ready to be output from any of the decryption pipelines, data in the bypass buffer may be output during that time. The following process may be used to determine what data is output from the IEE 110.

In determining what data to output from the IEE 110, the longest decryption pipeline is first checked for valid output data. If this pipeline has data to output then that data becomes the IEE output for that clock cycle. Note, that if there are more than one pipeline that are the longest (i.e., the same length) these longest pipelines may be evaluated round robin until a pipeline with valid output data is found or they may be evaluated in parallel to determine if any of these pipelines have valid output data. Either of these approaches work, because only one set of read data is fed into the pipelines for each clock cycle meaning that only one parallel stage across the various pipelines will have data read from the DDR memory, so only one of these longest pipelines will have valid output data each clock cycle. If the longest pipeline(s) do not have valid output data, then the last stage of next longest decryption pipeline is checked in the same manner for valid output data. This process may be repeated for all of the shorter decryption pipelines until a pipeline with valid output data is available. If none of the pipelines have valid data in the last stage, then output data from the IEE 110 may be taken from the latest stage of the bypass buffer (i.e., data the entered the pipeline earliest) that has valid data. In an alternative embodiment, the next shortest pipeline (where the length is defined as the number of clock cycles needed to decrypt data and is defined as one for the bypass buffer.) Some examples will be provided to describe how data may be output from the IEE.

In a first example, the first five read requests use the AES pipeline 114. Then a sixth data read comes in for plaintext data. That data can be read directly out of the IEE 110 as the AES pipeline does not have data that has been completely processed, and the AES pipeline 114 will not have data ready to be output until the $20^{th}$ clock cycle. In this example, any plaintext data received by the IEE will be directly read out until the AES pipeline 114 completes processing its data. When the plaintext data is output from the IEE, its valid bit will also be cleared preventing that data from being output a second time. Starting at the $21^{st}$ clock cycle and through the $25^{th}$ clock cycle, data will be output from the AES pipeline. So if during the $21^{st}$ clock cycle to the $25^{th}$ clock cycle plaintext data is read from the memory, it will progress through the bypass buffer 112 until it either reaches the end of the bypass buffer or until none of the other pipelines have data ready for output.

In a second example, each of the pipelines has various data moving through, but at the current clock cycle none of the pipelines have data in the $20^{th}$ stage. In this situation, the next highest stage with data that may be output will be output by the IEE 110. So data in the PRINCE buffer 142 or data in the bypass buffer may be output. So if the bypass buffer 112 has data in the $18^{th}$ stage and the PRINCE buffer 142 had data in the $17^{th}$ stage, then the data from the bypass buffer 110 will be output. If the PRINCE buffer 142 has data in the $16^{th}$ stage and the bypass buffer does not have data in any stage greater than the $16^{th}$ stage, then the PRINCE pipeline will output the data from its $16^{th}$ stage. If neither the AES pipeline 114 nor the PRINCE pipeline 116 have data ready to output, then the bypass buffer 112 will output its highest stage data. When the data is output, its valid bit is cleared preventing the data from being output a second time.

In an alternative embodiment, when none of the stages have valid data in the $20^{th}$ stage, then the next longest pipeline with valid data will be selected to output that data. So in this embodiment, valid data ready for output in the PRINCE buffer 142 would take precedence over data in the bypass buffer 112, even if the plaintext data in the bypass buffer 112 was received first. The valid bit for the PRINCE output will then be cleared.

The DDR re-order buffer 104 receives the data output from the IEE 110. The DDR re-order buffer 104 re-orders the received data as needed before being sent to the SoC interface 106. The address of the data is used as an order tag so that the re-order buffer can identify the various blocks of output data. Various known implementations of the DDR re-order buffer 104 and the SoC interface 106 may be used.

Figure 2:
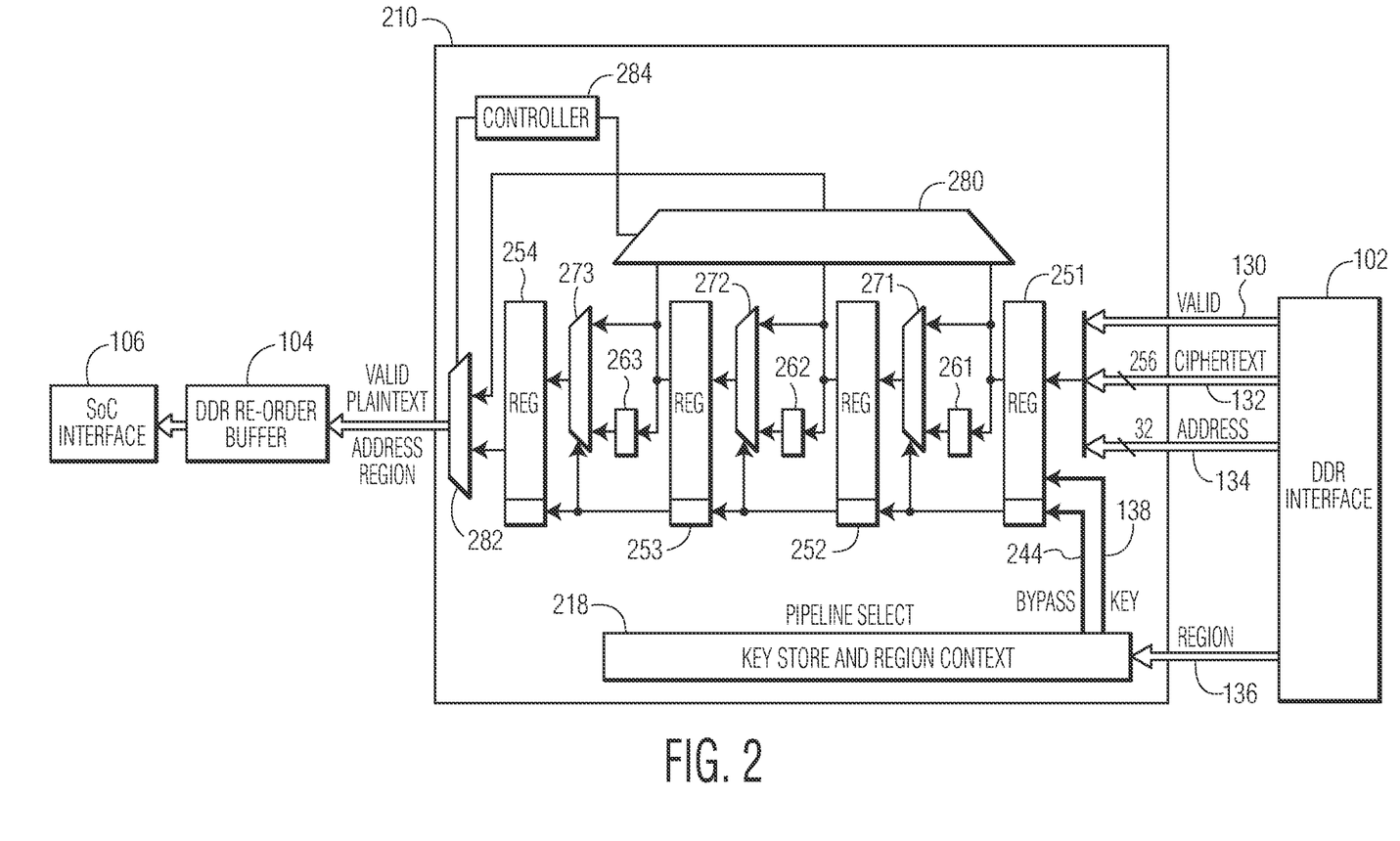
FIG. 2 illustrates an embodiment of an IEE that shares registers between two pipelines.

Because the data read from the DDR memory will only be placed in one of the pipelines, the various pipelines can share registers to streamline the implementation of the IEE, and this may reduce the area required to implement the IEE. FIG. 2 illustrates an embodiment of an IEE that shares registers between two pipelines. As in FIG. 1, the system includes DDR interface 102, IEE 210, DDR re-order buffer 104, and SoC interface 106. The DDR interface 102, DDR re-order buffer 104, and SoC interface 106 are the same as those described with respect to FIG. 1 and function in the same way. The IEE 210 functions in the same way as the IEE 110 from an input and output standpoint, but uses a different structure to accomplish the same functions.

The IEE 210 includes a key store and region context logic 218 that operates similar to the key store and region context logic 118. One difference is that the key store and region context logic 218 produces a bypass signal 244 instead of pipeline select signals 140. The bypass signal 244 indicates whether the data received from the DDR interface is plaintext data or not. If the data is plaintext data then the processing pipeline bypasses the decryption processing and moves the data from register to register without any change. The bypass signal value for a given set of input data from the DDR memory moves with that data through the registers.

In the example of FIG. 2, it will be assumed that there are two pipelines. One is for plaintext, and the other is for decrypting encrypted data read from the DDR memory. It is noted that more pipelines may be implemented as well using this architecture where the bypass signal can be expanded in function to indicate the type of decryption process to be used on the data entering the pipeline. The pipeline may include registers 251, 252, 253, 254, multiplexers 271, 272, 273, bypass multiplexer 280, output multiplexer 282, and cryptographic logic 261, 262, 263. As described above, the IEE 210 receives the valid data flag 130, ciphertext 132, address 134, and region 136 from the DDR interface 102. The valid data flag 130, ciphertext 132, and address 134 are fed into a first register 251. The key store and region context logic 218 receives the region signal 136, where the region signal 136 operates as described above. The key store and region context logic 218 produces the bypass signal 244 and the key 138 associated with the region where the data received is stored in the DDR memory. The bypass signal 244 and key 138 (if any) are also fed into the first register along with the valid flag 130, ciphertext 132, and address 134. At the next clock cycle the ciphertext in the first register 251 is output to the cryptographic logic 261, the multiplexer 271, and the multiplexer 280. The valid flag 130, address 134, bypass 244, and key 138 are also output from the first multiplexer 271 and fed into the second register 252. The key 138 is also fed into the cryptographic logic 261.

The cryptographic logic 261 receives the ciphertext 132 from the first register 251 and processes the ciphertext 132 to carry out one stage of the decryption of the ciphertext 132. The output of the cryptographic logic 261 is input into the multiplexer 271. In this example, the cryptographic logic 261 only carries out cryptographic processing according to one cryptographic scheme such as for example AES or PRINCE. In other embodiments, the cryptographic logic 261 may be able to carry out different cryptographic processing according to more than one cryptographic scheme where bypass signal indicates which cryptographic processing to apply to the received ciphertext.

The bypass signal 244 output from the first register 251 is used to control the first multiplexer 271. If the bypass signal 244 indicates that the data in the first register 251 is ciphertext, then the first multiplexer 271 outputs the output of the cryptographic logic 261 to the next register 252. If the bypass signal 244 indicates that the data in the first register 251 is plaintext, then the first multiplexer 271 outputs the plaintext received from the first register 251 to the next register 252.

The second register 252, second cryptographic logic 252, and second multiplexer 272 operate in the same manner as their first counterparts 261, 261, 271. The same is true for the third register 253, third cryptographic logic 253, and third multiplexer 273. A fourth register 254 receives the output from the third register 253, second cryptographic logic 253, and second multiplexer 273.

The output multiplexer 282 provides the output of the IEE 210 that includes the valid flag, plaintext, address, and region information for the data read from the DDR memory. The output multiplexer receives a control signal from a controller 284 that indicates whether the data in the register 254 is to be output or if bypass data from one of the prior registers is to be output. As previously discussed, if there is current valid data in the final register 254, that data will be output and the controller 284 may determine the presence of valid data based upon the valid flag in the register. If the data in the final register is not valid, i.e., there is no data in this cycle, then the controller 284 may determine the other valid data in the pipeline is to be output instead. Based upon that determination, a control signal is sent by the controller 284 to the bypass multiplexer 280 to select which of the received inputs from the first register 251, second register 252, and the third register 253 is to be output by the bypass multiplexer 280. The output of the bypass multiplexer 280 is input into the output multiplexer 282. Accordingly, the control signal received by the output multiplexer 282 from the controller 284 indicates which of the inputs to the output multiplex 282 is to be selected and output from the IEE 210. A priority encoder is used to always select the oldest bypass data for output. When the bypass is output, its valid bit is cleared preventing it from being output again.

In FIG. 2 only three stages are illustrated to simplify the description. In typical implementations, the pipeline may include any number of stages, such as the 20 stages described above with respect to FIG. 1. The approach of FIG. 2 has the advantage of simplifying the overall structure of the IEE 210 so that one shared pipeline can be used to move the data through the pipeline. This is possible because even when there are multiple pipelines present, there is only data in one pipeline for each stage across the pipelines.

Figure 3:
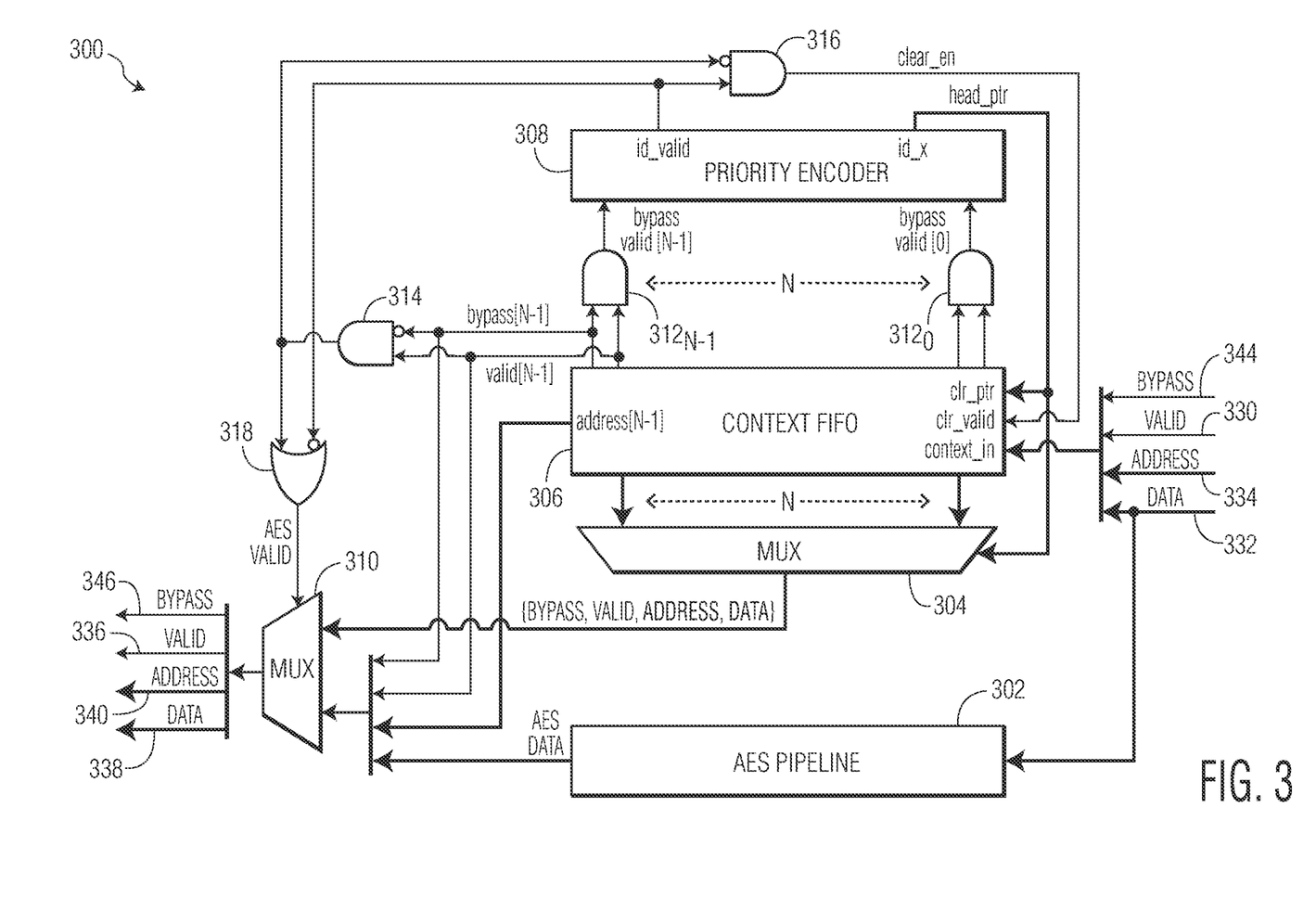
FIG. 3 illustrates a detailed implementation of an IEE using an AES pipeline with a bypass.

FIG. 3 illustrates a detailed implementation of an IEE using an AES pipeline with a bypass. The IEE 300 includes an AES pipeline 302, a bypass multiplexer 304, a context FIFO 306, a priority encoder 308, an output multiplexer 310, AND gates 312, 314, 318, and OR gate 318. As before, the IEE 300 receives a bypass flag 344, valid flag 330, address 334, and data 332 read from the memory. The data 332 read from the memory may be either encrypted data or plaintext data. The bypass flag 344 may be generated by the key store and region context logic based upon the region in the DDR memory where the data 332 is stored.

AES pipeline 302 receives the data 332 and decrypts the data using a key provided by the key store and region context logic. Note, that the AES pipeline 302 could be replaced by a different pipeline using a different decryption scheme. The output of the AES pipeline 302 is provided to a first input of the output multiplexer 310.

The bypass flag 344, valid flag 330, address 334, and data 332 read from the DDR memory are all also input into the context FIFO 306 where the data may be input into a first register. With each clock cycle, the data in the context FIFO 306 progresses forward through the series of registers in the context FIFO 306. The context FIFO 306 also outputs the bypass flag, valid flag, and address from the last register and are also provided to the first input of the output multiplexer 310.

The bypass multiplexer 304 has inputs each connected to one of the registers in the context FIFO 306. The bypass multiplexer 304 receives a control signal head_ptr that selects one of the inputs to be the output of the bypass multiplexer 304. The control signal may also be called a stage pointer. The output, including the bypass flag, valid flag, address, and data from the selected register, is provided to a second input of the output multiplexer 310.

The priority encoder 308 includes logic that determines when and what data from the context FIFO 306 should next be output to the output multiplexer 310 via the bypass multiplexer 304. AND gates 312 are connected to the registers in the context FIFO 306. Each of the AND gates 312 receives the valid flag and bypass flag from each respective register in the context FIFO 306. The output of the AND gates 312 will be "1" when both the input bypass flag and valid flag are "1", i.e., when the data in the register is valid and the data in the register is plaintext data. The priority encoder 308 may then set the head_ptr value to indicate the highest numbered register with valid bypass data. This will cause the bypass multiplexer 304 to select and output the data from the indicated register in the context FIFO 306. The head_ptr value is also provided to a clr_ptr input of the context FIFO 306. A clr_valid input of the context FIFO 306 also receives a clear_en flag that indicates that the register indicated by head_ptr is to be cleared, because that data will be output from the IEE, so it needs to be ignored going forward as it has already been written out of the IEE. As a result the valid pointer in the register indicated by head_ptr is set to invalid. The priority encoder 308 also produces an id_valid flag that indicates that head_ptr is valid, i.e., that there is at least one value in the context FIFO 306 ready to be output.

AND gate 314 receives the bypass flag and valid flag from the last register. AND gate 314 ANDs the inverted bypass flag with the valid flag, so the output of AND gate 314 is "1" when the bypass flag is invalid and the data is valid, i.e., when the AES data is the valid data in the last stage.

AND gate 316 produces the clear_en flag. AND gate receives id_valid from the priority encoder 308 and the output of AND gate 314 as inputs. The output of AND gate 316 is "1" when the output of AND gate 314 is "0" and id_valid is "1", i.e., when the AES data is not valid and when the id_valid flag indicates that the head_ptr is valid. In that case the data in the register indicated by head_ptr should be cleared.

OR gate 318 produces an AES valid flag that controls the output multiplexer 310. When the AES valid flag indicates valid data, then the output multiplexer 310 selects and outputs the data received at the first input from the AES pipeline 302 and its associated address, bypass, and valid data from the last register in the context FIFO 306. If the AES valid flag does not indicate valid data, then the output multiplexer 310 selects and outputs the data received at the second input from the output of the bypass multiplexer 304. The OR gate receives the id_valid flag and the output of AND gate 314 as inputs. The AES valid flag will be valid when either AES data is indicated as valid based upon the bypass flag and valid flag in the last register of the context FIFO 306 or when the id_valid is not valid. The output multiplexer 310 provides the outputs of the IEE 300 including the bypass flag 346, valid flag 340, address 340, and data 338, where the data 338 is plaintext data.

Various embodiments have been described that allow for plaintext data to bypass encrypted data in the IEE when the proper conditions arise. As described above data enters one of the pipeline(s) (if there is more than one) each clock cycle, and data comes out of the pipeline(s) each clock cycle. The embodiments described herein prevent stalling and collisions in the IEE. As described each of the pipelines are made to have a length equal to the longest pipeline. When the longer pipelines, i.e., the decryptions pipelines, do not have valid data to output, data from a shorter pipeline may be output instead, thereby bypassing other data in the various pipelines and minimizing the latency of the plaintext data through the pipeline.

The IEE disclosed herein may be a part of a memory controller that controls reading data from the memory. The fact that the data being read was encrypted and stored in the memory will be transparent to the end user, as the memory controller decrypts the encrypted data and presents plaintext data to the user. Further, this process may also be performed for writing data to the DDR memory where plain text data may be written to the memory ahead of data that is being encrypted in an encryption pipeline.

While the embodiments described above use encryption/decryption processing, the embodiments may apply to any type of parallel processing pipelines that operate on different data pipelines. For example, there may be two different processing pipelines with different latencies, and each clock cycle an information block is received including data, a tag, a valid signal, and a pipeline select signal. The pipeline select signal is used to feed the information block in to the selected pipeline. Then an information block may be output from the data processing engine each clock cycle (i.e., if there is valid data available), wherein the information block comes from the longer pipeline when there is valid data available. Otherwise, the information block comes from the shorter pipeline if there is valid data available.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. An inline encryption engine in a memory controller configured to process data read from a memory, comprising:
   a first data pipeline configured to:
      receive data that is encrypted data, an order tag of the encrypted data, and a first validity flag;
      decrypt the encrypted data from the memory; and
      output decrypted plaintext data;
   a second data pipeline configured to receive data that is plaintext data, an order tag for the data, and a second validity flag, wherein the second data pipeline includes a buffer so that the second data pipeline has the same length as the first data pipeline;
   an output multiplexer configured to select and output data from either the first pipeline or the second pipeline; and
   control logic configured to control the output multiplexer, wherein the control logic is configured to output valid data from the second pipeline when the first pipeline does not have valid output decrypted plaintext data available.

2. The inline encryption engine of claim 1, further comprising a key store and region context logic configured to provide a cryptographic key to the first pipeline based upon a region of the memory where the encrypted data is stored.

3. The inline encryption engine of claim 2, wherein the key store and region context logic are further configured to select whether the first pipeline or the second pipeline receives data read from the memory.

4. The inline encryption engine of claim 1, further comprising a third pipeline including a buffer so that the third data pipeline has the same length as the first data pipeline and the third pipeline configured to:
   receive data that is encrypted data, an order tag for the data and a third validity flag;
   decrypt the encrypted data from the memory; and
   output decrypted plaintext data,
   wherein an output multiplexer configured to select and output data from either the first pipeline, the second pipeline, or the third pipeline.

5. The inline encryption engine of claim 4, wherein the control logic is configured to output valid data from the third pipeline when the first pipeline does not have valid output decrypted plaintext data available.

6. The inline encryption engine of claim 4, wherein the control logic is configured to output valid received data from the second pipeline when the first pipeline and the third pipeline do not have valid output decrypted plaintext data available.

7. The inline encryption engine of claim 1, further comprising:
a memory interface connected to an input of the inline encryption engine; and
a re-order buffer connected to the output of the inline encryption engine wherein the order tag identifies the out of order blocks of output data.

8. The inline encryption engine of claim 1, wherein the order tag is a memory address.

9. An inline encryption engine in a memory controller configured to process data read from a memory, comprising:
a first-in-first-out buffer (FIFO) configured to receive the data read from the memory, a validity flag associated with the data, an address of the data, and a bypass flag associated with the data, wherein the bypass flag indicates whether the data is plaintext data or encrypted data;
a cryptographic pipeline configured to:
receive the data read from the memory; and
perform a cryptographic function on data from the memory;
a bypass multiplexer connected to each stage of the FIFO configured to output the data and the validity flag, bypass flag, and address associated with the data from a selected stage of the FIFO based upon a stage pointer;
an output multiplexer configured to select and output data from either the bypass multiplexor or the cryptographic pipeline based upon a first control signal; and
control logic configured to control the output multiplexer and the bypass multiplexer and to produce the stage pointer and the first control signal.

10. The inline encryption engine of claim 9, further comprising a key store and region context logic configured to produce the bypass signal associated with the data based upon the region of the memory where the data is stored.

11. The inline encryption engine of claim 10, wherein the key store and region context logic are further configured to provide a cryptographic key to the cryptographic pipeline based upon a region of the memory where the data is stored.

12. The inline encryption engine of claim 9, wherein control logic produces the first control signal that indicates whether the output of the output multiplexer is from the cryptographic pipeline or the bypass multiplexor connected to the FIFO.

13. The inline encryption engine of claim 9, wherein control logic includes a priority encoder configured to:
receive inputs based upon the bypass flag and validity flag from each stage of the FIFO; and
produce the stage pointer, wherein the stage pointer indicates the stage of the FIFO with received valid input data available to be output.

14. The inline encryption engine of claim 9, wherein
the control logic is configured to produce a clear enable signal, and
the FIFO is configured to clear the validity flag of a stage indicated by the stage pointer based upon the clear enable signal.

15. The inline encryption engine of claim 9, wherein the first control signal is based upon a bypass flag and a validity flag from the last stage of the FIFO and a stage pointer validity flag.

16. The inline encryption engine of claim 9, further comprising:
a memory interface connected to an input of the inline encryption engine; and
a re-order buffer connected to the output of the inline encryption engine, wherein the address of the data is used as a tag to identify the out of order blocks of output data.

17. The inline encryption engine of claim 16, further comprising a system on chip interface connected to the re-order buffer.

18. An inline encryption engine in a memory controller configured to process data read from a memory, comprising:
a first-in-first-out buffer (FIFO) with an output register configured to receive the data read from the memory, a validity flag associated with the data, an address of the data, and a bypass flag associated with the data, wherein
the bypass flag indicates whether the data is plaintext data or encrypted data, each stage of the FIFO includes:
a register;
a cryptographic logic connected to the register; and
a multiplexer that produces the output of the stage and receives inputs from the register and the cryptographic logic, wherein the output is selected based upon the bypass flag;
a bypass multiplexer connected to each stage of the FIFO configured to output the data and the validity flag, bypass flag, and address associated with the data from a selected stage of the FIFO based upon a stage pointer;
an output multiplexer configured to select and output data from either the bypass multiplexer or the FIFO based upon a first control signal; and
control logic configured to control the output multiplexer and the bypass multiplexer and to produce the stage pointer and the first control signal.

19. The inline encryption engine of claim 18, further comprising a key store and region context logic configured to produce the bypass signal associated with the data based upon the region of the memory where the data is stored.

20. The inline encryption engine of claim 19, wherein the key store and region context logic are further configured to provide a cryptographic key to the cryptographic logic based upon a region of the memory where the data is stored.

21. The inline encryption engine of claim 18, wherein the first control signal that indicates whether the output of the output multiplexer is from the bypass multiplexor or the FIFO.

22. The inline encryption engine of claim 18, wherein the stage pointer indicates the stage of the FIFO an earliest received valid input data is available to be output.

23. The inline encryption engine of claim 18, further comprising:
a memory interface connected to an input of the inline encryption engine; and
a re-order buffer connected to the output of the inline encryption engine, wherein the address of the data is used as a tag to identify the out of order blocks of output data.

24. The inline encryption engine of claim 18 further comprising a system on chip interface connected to the re-order buffer.

* * * * *